United States Patent
Agan et al.

(10) Patent No.: US 9,707,633 B2
(45) Date of Patent: *Jul. 18, 2017

(54) MITER SAWS HAVING LOCKING ASSEMBLIES FOR OPTIMAL POSITIONING OF CUTTING BLADES

(71) Applicant: Black & Decker Inc., Newark, DE (US)

(72) Inventors: Kevin S. Agan, Fallston, MD (US); Daryl S. Meredith, York, PA (US)

(73) Assignee: Black & Decker Inc., New Britain, CT (US)

( * ) Notice: Subject to any disclaimer, the term of this patent is extended or adjusted under 35 U.S.C. 154(b) by 795 days.

This patent is subject to a terminal disclaimer.

(21) Appl. No.: 13/863,568

(22) Filed: Apr. 16, 2013

(65) Prior Publication Data

US 2013/0239767 A1  Sep. 19, 2013

Related U.S. Application Data

(63) Continuation of application No. 12/132,686, filed on Jun. 4, 2008, now Pat. No. 8,418,590.

(51) Int. Cl.
*B23D 45/02* (2006.01)
*B23D 45/04* (2006.01)
(Continued)

(52) U.S. Cl.
CPC ......... *B23D 45/024* (2013.01); *B23D 45/048* (2013.01); *B27B 5/29* (2013.01);
(Continued)

(58) Field of Classification Search
CPC .... B23D 45/003; B23D 45/02; B23D 45/021; B23D 45/024; B23D 45/025;
(Continued)

(56) References Cited

U.S. PATENT DOCUMENTS 882,296 A    3/1908  Carroll
1,489,965 A  4/1924  Prentice
(Continued)

FOREIGN PATENT DOCUMENTS

DE  3216935   11/1983
DE  3744716    6/1988
(Continued)

OTHER PUBLICATIONS

European Search Report for European Application No. EP 09 16 1725, dated Nov. 6, 2013, 7 pages.

*Primary Examiner* — Phong Nguyen
(74) *Attorney, Agent, or Firm* — Adan Ayala

(57) ABSTRACT

A miter saw includes a base, a table disposed on the base and having a top surface extending between a front end and a rear end of the table, a cutting assembly overlying the table, the cutting assembly including a rotatable cutting blade having a peripheral cutting edge, and a motor for driving the cutting blade. The miter saw has at least one guide rail interconnecting the table and the cutting assembly for guiding sliding movement of the cutting assembly over the table between a rear-most position and a forward-most position. A locking assembly is coupled with the cutting assembly for locking the cutting assembly in only one position between the rear-most position and the forward-most position. During a cutting operation, the locking assembly remains coupled with the cutting assembly while the cutting blade moves downwardly for preventing sliding movement of the cutting assembly.

20 Claims, 11 Drawing Sheets

(51) Int. Cl.
  *B27B 5/29* (2006.01)
  *B27B 27/04* (2006.01)
(52) U.S. Cl.
  CPC .......... *B27B 27/04* (2013.01); *Y10T 83/7697* (2015.04); *Y10T 83/8773* (2015.04); *Y10T 83/8878* (2015.04)
(58) Field of Classification Search
  CPC .... B23D 45/028; B23D 45/04; B23D 45/042; B23D 45/044; B23D 45/046; B23D 45/048; B27B 27/04; B27B 27/06; B27B 5/29; Y10T 83/7688; Y10T 83/7693; Y10T 83/7697; Y10T 83/7701; Y10T 83/7705; Y10T 83/7722; Y10T 83/7726; Y10T 83/7755; Y10T 83/7763; Y10T 83/7759; Y10T 83/7788; Y10T 83/8773; Y10T 83/8878; Y10T 16/5358
  USPC .................................................. 182/209–211
  See application file for complete search history.

(56) References Cited

U.S. PATENT DOCUMENTS

| | | |
|---|---|---|
| 4,328,728 A | 5/1982 | Ferdinand et al. |
| 4,647,088 A | 3/1987 | Nelson |
| 4,869,142 A | 9/1989 | Sato et al. |
| 5,060,548 A | 10/1991 | Sato et al. |
| 5,287,780 A | 2/1994 | Metzger et al. |
| 5,297,463 A | 3/1994 | O'banion et al. |
| 5,347,902 A | 9/1994 | Brickner et al. |
| 5,957,021 A | 9/1999 | Meredith et al. |
| 6,067,885 A | 5/2000 | Brunson et al. |
| 6,357,803 B1 | 3/2002 | Lorek |
| 6,425,309 B1 | 7/2002 | Stumpf et al. |
| 6,426,309 B1 | 7/2002 | Miller et al. |
| 6,886,440 B2 | 5/2005 | Parks et al. |
| 6,899,005 B1 | 5/2005 | O'banion et al. |
| 6,997,091 B1 | 2/2006 | Shibata |
| 7,210,385 B2 | 5/2007 | Stumpf et al. |
| 7,252,027 B2 | 8/2007 | Meredith et al. |
| 8,418,590 B2 | 4/2013 | Agan et al. |
| 2002/0152867 A1 | 10/2002 | Meredith et al. |
| 2004/0079214 A1 | 4/2004 | Meredith et al. |
| 2004/0103768 A1 | 6/2004 | Meredith |
| 2007/0074611 A1 | 4/2007 | Hu |
| 2007/0214928 A1 | 9/2007 | Wikle |
| 2009/0235794 A1 | 9/2009 | Inai |

FOREIGN PATENT DOCUMENTS

| | | |
|---|---|---|
| DE | 3807158 | 11/1988 |
| EP | 1419862 | 5/2004 |
| EP | 2208592 | 7/2010 |
| WO | 2004067236 | 12/2004 |

20

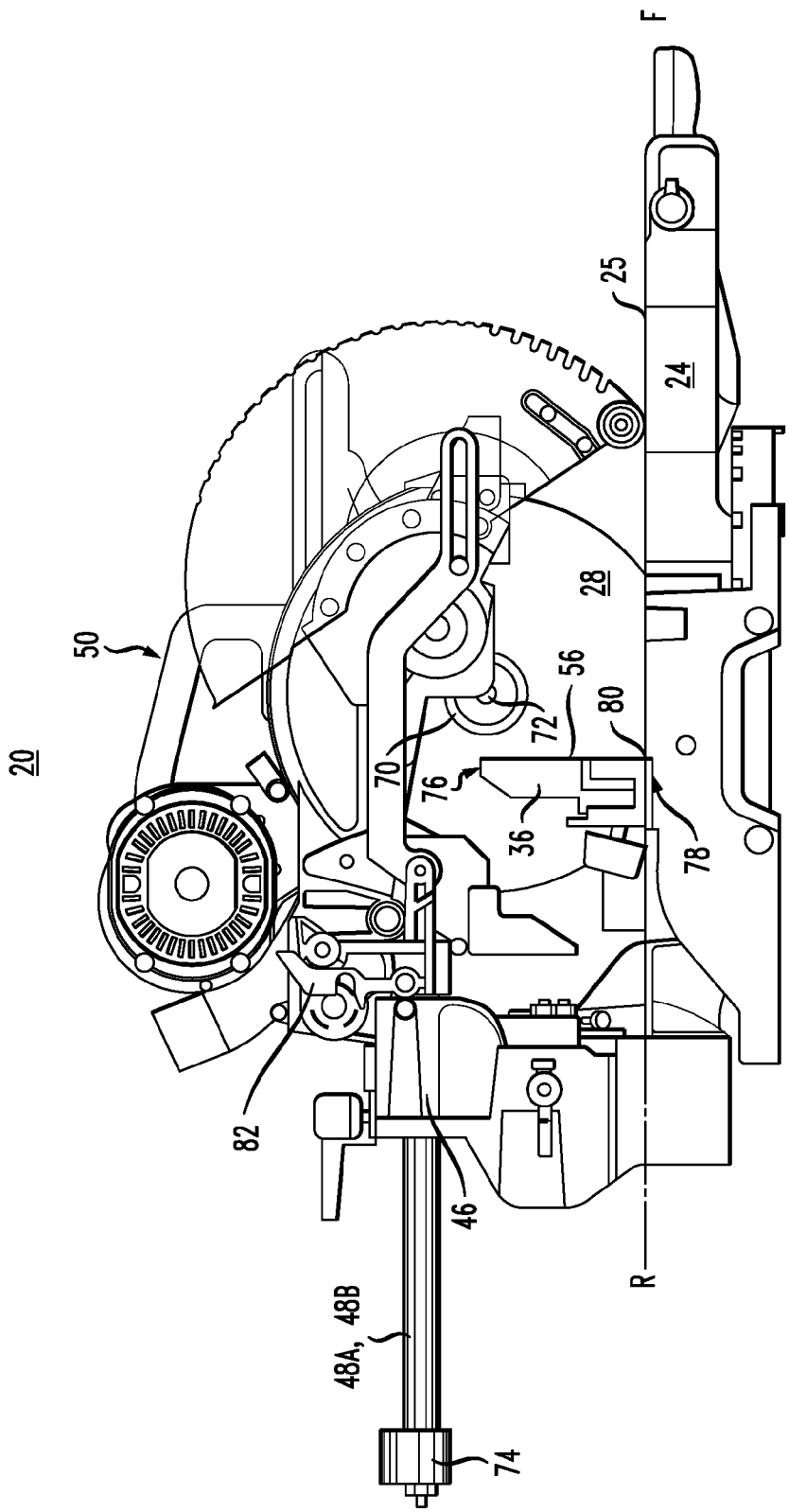

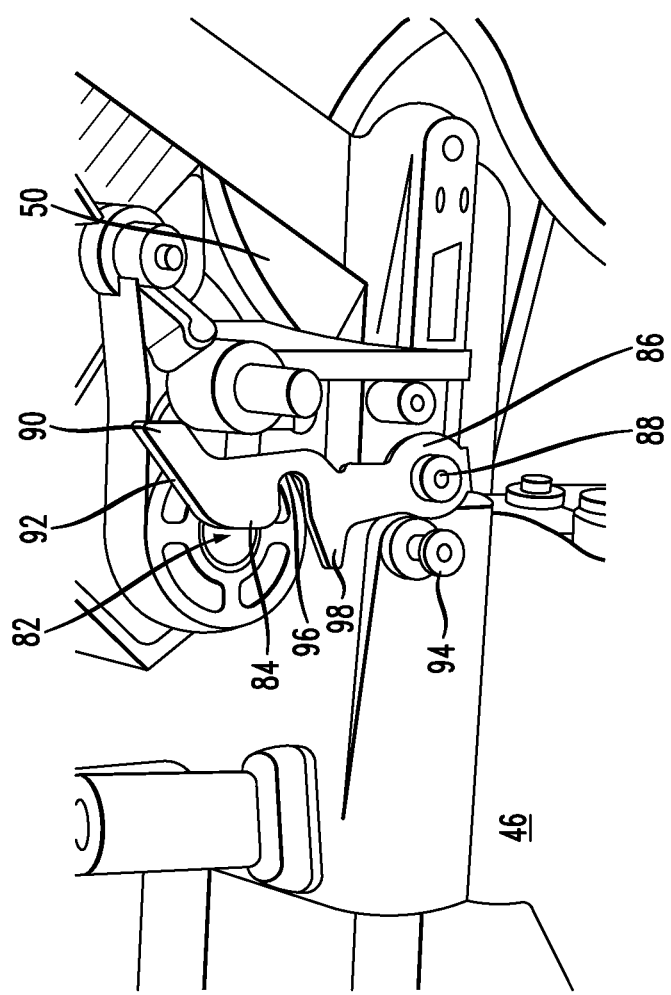

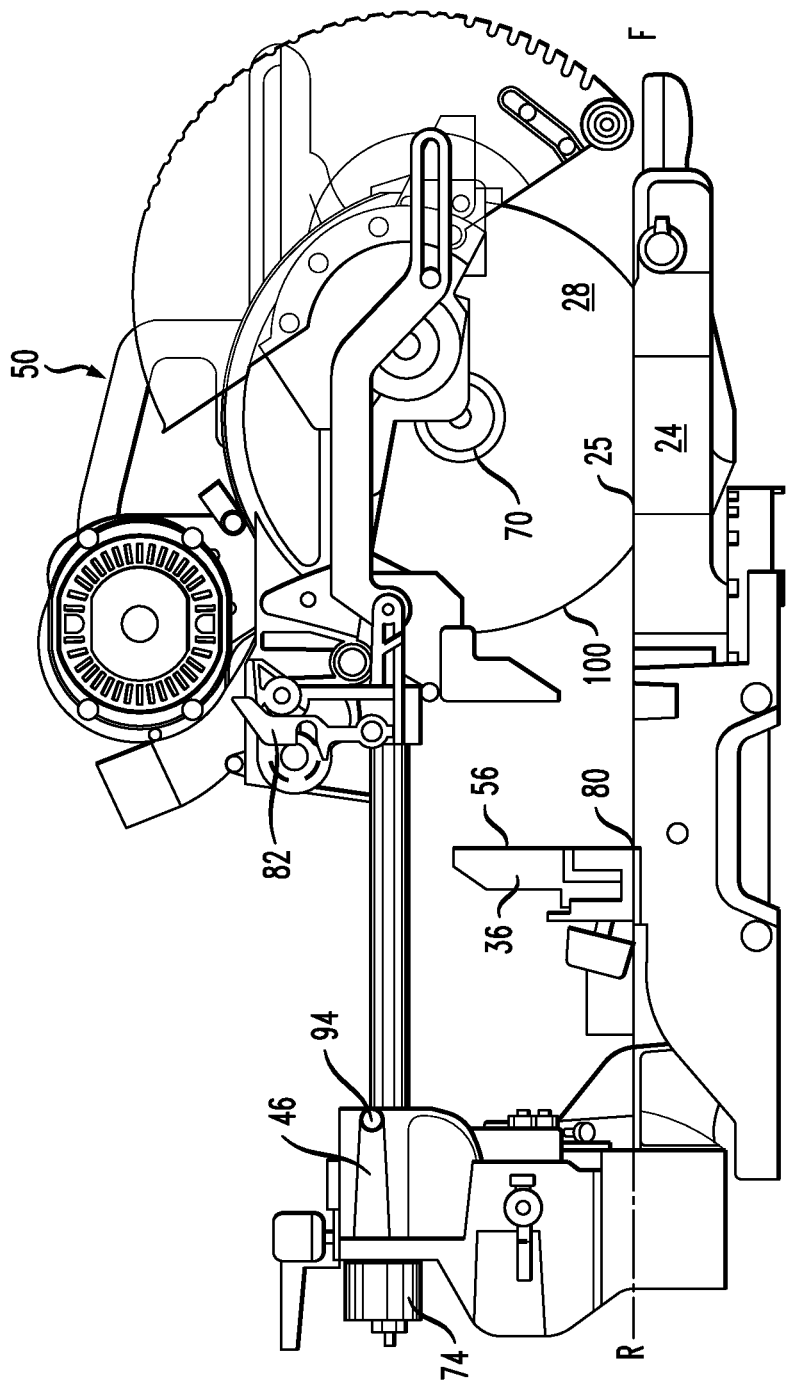

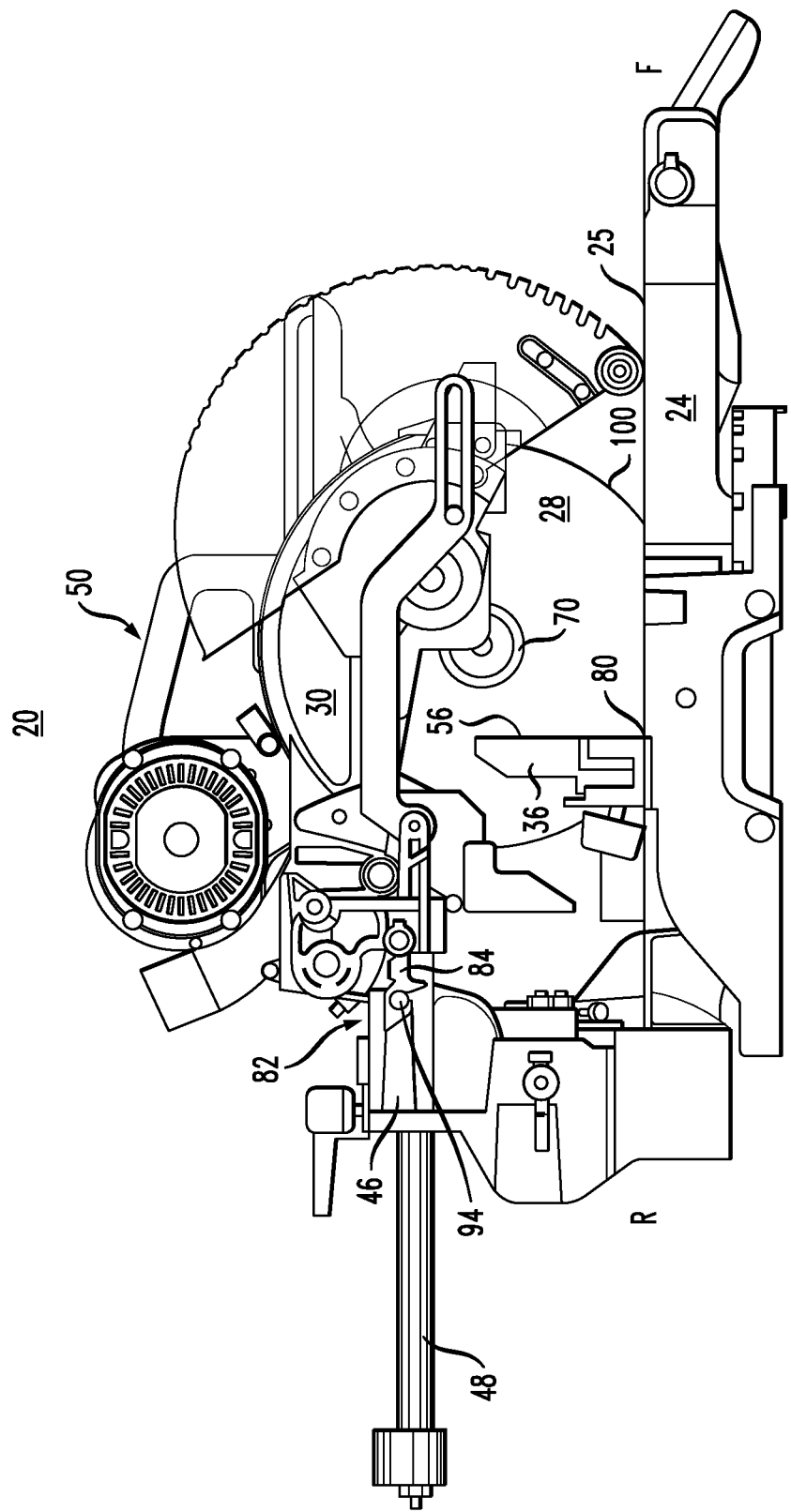

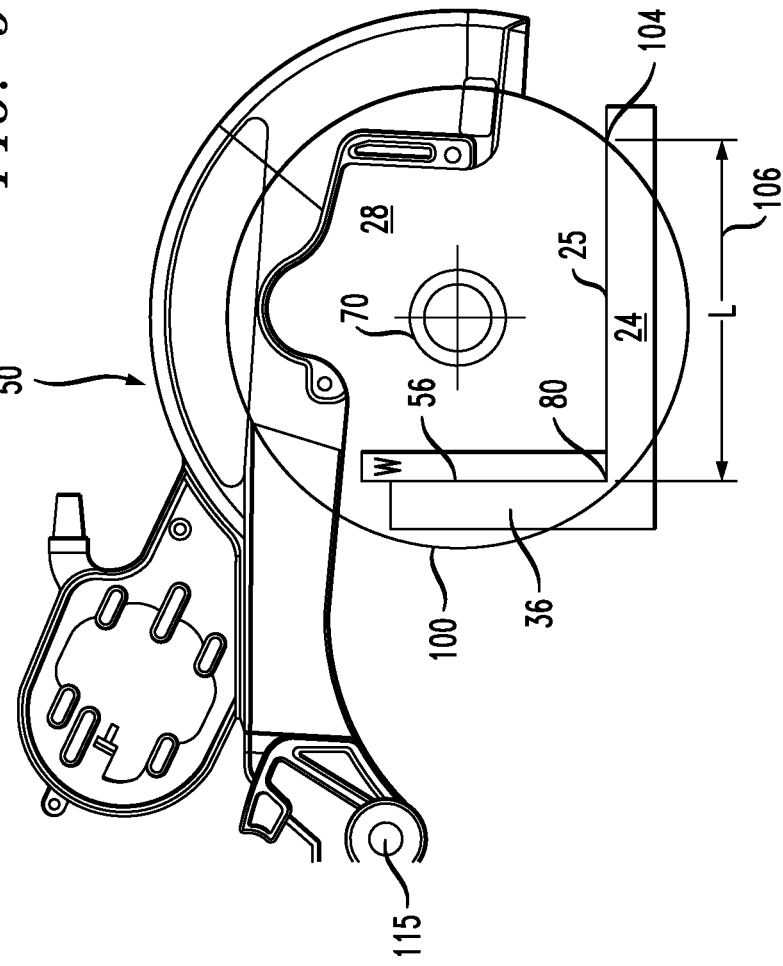

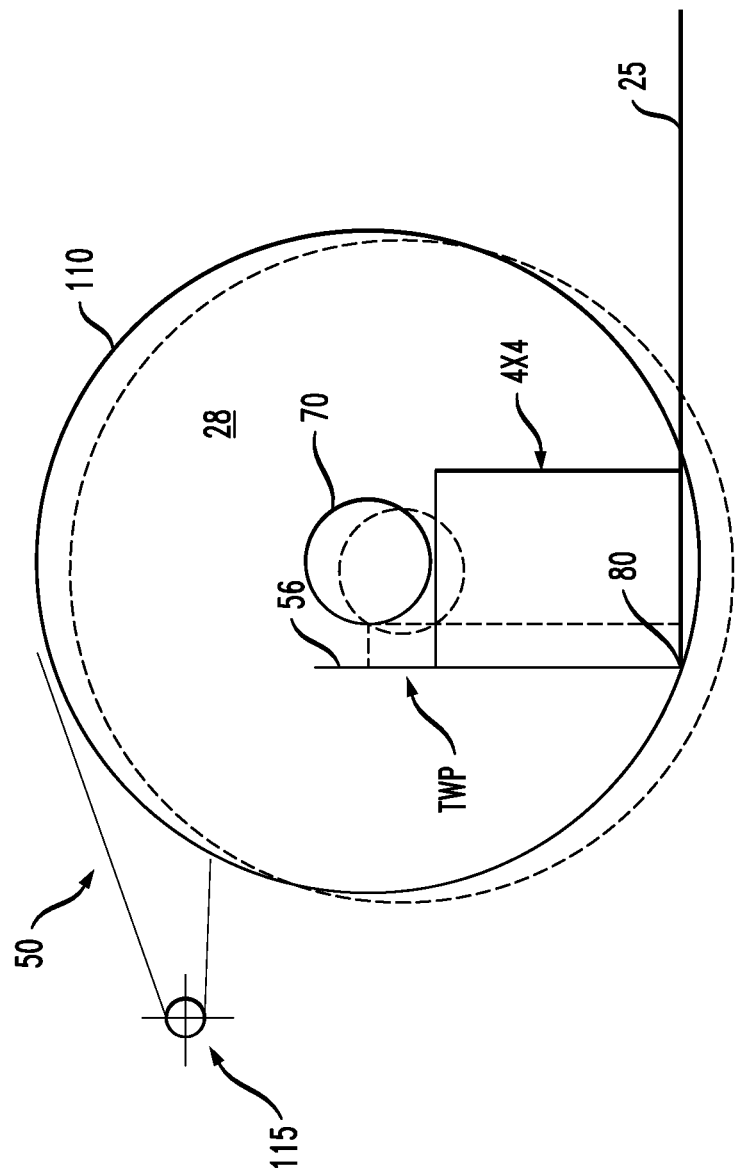

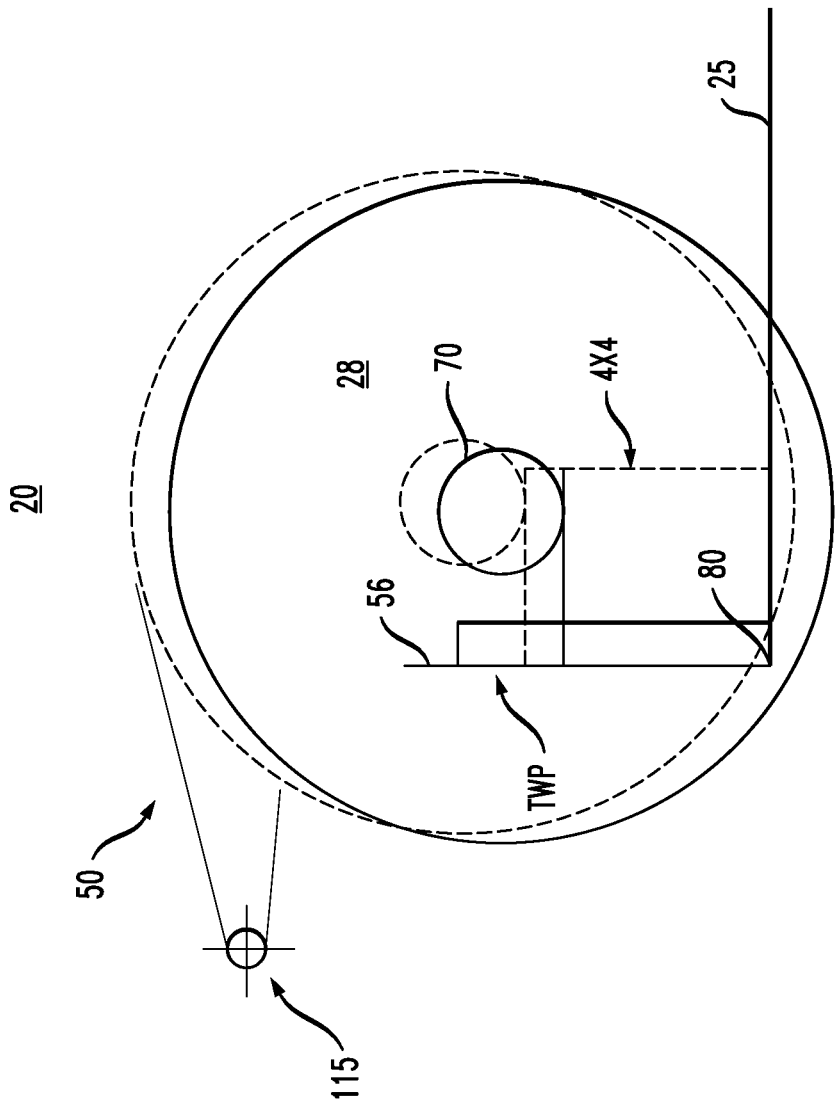

FIG. 15B
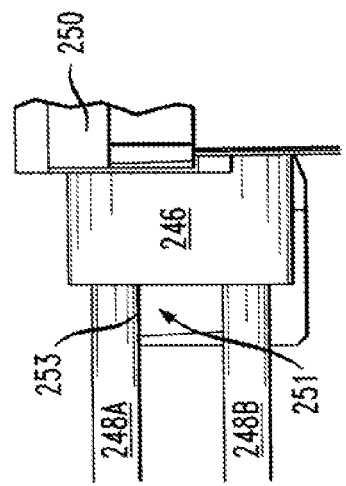
FIG. 13
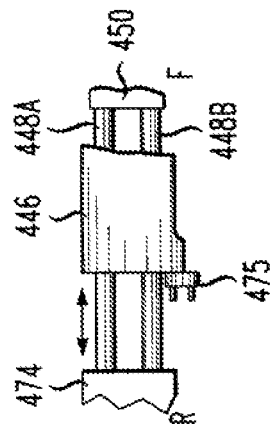
FIG. 15A
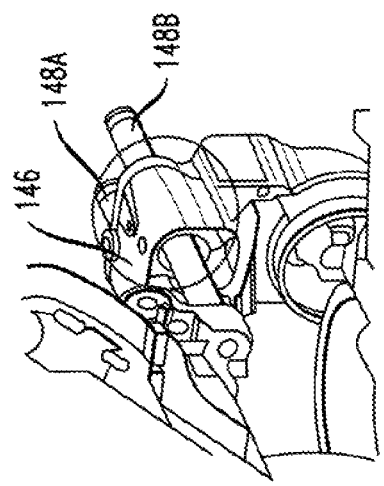
FIG. 12
FIG. 14A
FIG. 14B
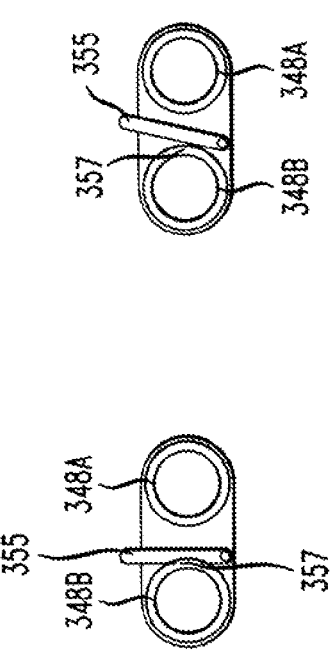

MITER SAWS HAVING LOCKING ASSEMBLIES FOR OPTIMAL POSITIONING OF CUTTING BLADES

CROSS REFERENCE TO RELATED APPLICATIONS

The present application claims benefit of commonly assigned U.S. patent application Ser. No. 12/132,686, filed Jun. 4, 2008, to be issued as U.S. Pat. No. 8,418,590 on Apr. 16, 2013, the disclosure of which is hereby incorporated by reference herein.

BACKGROUND OF THE INVENTION

Field of the Invention

The present invention generally relates to power tools used for cutting work pieces, and more specifically relates to sliding miter saws.

Description of the Related Art

During construction, manufacturing, and assembly operations, pieces of material such as wood, plastic, and metal (i.e. work pieces) must be cut to exact lengths, shapes, and dimensions. In many instances, power equipment and saws are used for cutting these work pieces. One type of saw, commonly referred to as a miter saw, has a cutting blade, a motor for driving the cutting blade, a horizontally-extending table, and a vertically-extending fence that cooperates with the table to support the work pieces during cutting operations. The horizontally-extending table provides a horizontal support surface for the work pieces, and the fence provides a vertical support surface for the work pieces. The cutting blade of a conventional miter saw is rotatable about a vertically-extending axis for making vertical cuts at various angles relative to the vertical support surface of the fence. These vertical cuts are typically referred to as miter cuts.

In many designs, the work piece-supporting fence is divided into two parts that are separated from one another by a gap, and the cutting blade is adapted to pass through the gap during a cutting operation. Each of the two fence parts has a vertically-extending support surface, and the two support surfaces lie in a common plane. The two fence parts may be movable relative to one another for adjusting the gap space between the two fence parts.

In addition to conventional miter saws used to make vertical cuts, there are other types of miter saws that are used to make even more complex cuts. For example, a compound miter saw has a cutting blade that may be tilted at an angle relative to the horizontally-extending table, generally from 0 degrees to 45 degrees left of vertical. A cut made with the blade tilted at an angle to the horizontally-extending table, while remaining perpendicular to the front face of the fence, is known as a "bevel cut." A cut made with the blade set at an angle relative to the front face of the fence (miter angle) and at an angle relative to the base (bevel angle) is known as a "compound cut."

Another type of miter saw is commonly referred to as a dual bevel compound miter saw, which has a tiltable structure that enables the cutting blade to be positioned at a range of angles relative to the table from 45 degrees left of vertical to 45 degrees right of vertical. This arrangement allows for even more "compound cut" variations.

Still another type of miter saw is a slide miter saw including a rail system that enables the saw component to slide backward and forward over the table so as to increase the saw's cutting capabilities (see, e.g., U.S. Pat. No. 6,067, 885). Like non-sliding miter saws, slide miter saws have a base, a rotatable table attached to the base, a saw assembly including a motor, and a blade driven by the motor. The saw assembly is coupled with the table through a pivot arm that enables the saw assembly to be pivoted downwardly toward the table for cutting a work piece disposed on the table.

In some instances, an operator may want to limit or stop sliding movement of the cutting assembly between the front and rear ends of the table. For example, DE 3 744 716 discloses a circular saw for a wood working bench having a cutting assembly that is connected with guide rails that enable the cutting assembly to slide in forward and rear directions relative to a cutting surface of a table. The circular saw includes a housing having openings through which the guide rails are adapted to slide. The guide rails are stopped from sliding by a locking element that engages one of the slide rails. When it is desired to once again slide the cutting assembly forwardly or rearwardly, the locking element may be loosened.

EP 1 419 862 discloses a sliding compound miter saw having a latch hook provided on the cutting assembly and a latch post provided on a support housing for sliding guide rails. When the cutting assembly is near the support housing, the cutting assembly can be latched to the housing by engaging the latch post with the latch hook. After the latch is engaged with the latch post, the latch mechanism prevents a user from sliding the cutting assembly toward the forward end of the miter saw. When desired, the latch hook can be de-coupled from the latch post to once again permit forward sliding movement of the cutting assembly.

In spite of the above advances, there remains a need for improved sliding miter saws having sliding rail stop features for maximizing cutting operations. There also remains a need for sliding miter saws that make it easier for operators to know when the cutting assembly is properly positioned for properly cutting different types and sizes of work pieces.

SUMMARY OF THE INVENTION

In one embodiment of the present invention, a miter saw includes a base, a table disposed on the base, the table having a top surface extending between a front end and a rear end of the table, and a cutting assembly overlying the table, the cutting assembly including a rotatable cutting blade having a peripheral cutting edge, and a motor for driving the cutting blade. The miter saw desirably includes at least one guide rail interconnecting the table and the cutting assembly for guiding sliding movement of the cutting assembly over the table between a rear-most position and a forward-most position, and a locking assembly coupled with at least one of the cutting assembly and the at least one guide rail for locking the cutting assembly in an intermediate position located between the rear-most position and the forward-most position.

In one embodiment, the miter saw preferably has a fence secured to the base, the fence having a front face overlying the top surface of the table and having a lower end that intersects the top surface of the table at a corner, whereby the peripheral cutting edge of the cutting blade intersects the corner when the cutting assembly is in the intermediate position. When the cutting assembly is in the intermediate position, the peripheral cutting edge of the cutting blade may also intersect the top surface of the table at a second location that is spaced from the corner defined by the intersection of the front face of the fence and the top surface of the table.

The miter saw desirably includes a support housing connected with the table that is adapted to guide sliding motion of the at least one guide rail. The at least one guide rail preferably has a longitudinal axis that extends in a first plane that is substantially parallel with the top surface of said table. The cutting assembly is preferably adapted to slide simultaneously with the at least one guide rail. In one embodiment, the at least one guide rail may be two guide rails that are positioned next to one another, and that are adapted to slide simultaneously with one another for guiding sliding movement of the cutting assembly.

The miter saw desirably includes a linkage coupling a distal end of the cutting assembly with a proximal end of the at least one guide rail. The linkage may include a pivot for enabling the cutting assembly to be pivoted away from and toward the top surface of the table.

In one embodiment, the locking assembly includes a latch coupled with the cutting assembly and a latch post coupled with the support housing. The latch is desirably movable for engaging the latch post for locking the cutting assembly in the intermediate position. In one embodiment, the latch has a proximal end pivotally connected with the cutting assembly, a distal end, a sloping surface extending from the distal end toward the proximal end of the latch, a slot located between the sloping surface and the proximal end of the latch, and a stop flange extending laterally from a side of the latch and being disposed between the slot and the proximal end of the latch. The engagement of the slot of the latch with the latch post preferably prevents sliding movement of the cutting assembly toward either the front end or the rear end of the table.

In one embodiment, the locking assembly includes a groove formed in the at least one guide rail and a latch movable between a first position and a second position, whereby the latch is engageable with the groove when in the second position for locking the cutting assembly in the intermediate position.

In one embodiment, the intermediate position is an optimal cutting position for cutting certain types of work pieces such as crown moldings and tall base board pieces. As the cutting assembly slides between the rear-most and forward-most positions, the intermediate position is the location where the cutting assembly is best able to cut tall base board pieces and crown molding pieces. In other words, the intermediate position is the location where the tallest work pieces may be cut. This may be accomplished by shifting the blade washer and the pivot arm slightly forward of the rear-most position. The locking assembly is adapted to assist an operator in quickly, repeatedly, and reliably locating the cutting assembly at the intermediate position. In one embodiment, the forward shifting distance between the rear-most and the intermediate position is about 20-25 mm and more preferably about 22 mm. In one embodiment, the rear-most position is the optimal position for cutting one type of work piece, e.g. a 4×4 work piece, and the intermediate position is the optimal position for cutting a different type of work pieces, e.g. tall base board pieces.

In one embodiment, a miter saw includes a base, a table rotatably disposed on the base, the table having a top surface extending between a front end and a rear end thereof, and a cutting assembly overlying the table, the cutting assembly including a rotatable cutting blade having a peripheral cutting edge, and a motor for driving the cutting blade. The miter saw desirably has at least one guide rail coupled with the table and the cutting assembly for guiding sliding movement of the cutting assembly over the top surface of the table between the front and rear ends of the table, and a fence secured to the base and having a front face that overlies the top surface of the table, the front face having a lower end that intersects the top surface of the table at a corner, and a locking assembly coupled with at least one of the cutting assembly and the at least one guide rail for locking the cutting assembly in an intermediate position between the front and rear ends of the table. In the intermediate position, the peripheral cutting edge of the cutting blade intersects the corner defined by the intersection of the front face of the fence and the top surface of the table.

In one embodiment, the locking assembly may include a groove formed in the at least one guide rail and a projection provided on the support housing that is engageable with the groove, whereby the groove is provided at a predetermined location along the length of the at least one guide rail for positioning the cutting assembly at the intermediate position when the projection is seated in the groove.

In one embodiment, a miter saw preferably includes a base, and a table rotatably disposed on the base, the table having a top surface extending between a front end and a rear end of the table. The miter saw desirably has a guide rail support housing connected with the table, and at least one guide rail extending through the guide rail support housing, whereby the guide rail support housing is adapted to guide sliding movement of the at least one guide rail within a plane that is substantially parallel with the top surface of the table. The saw preferably includes a cutting assembly overlying the table, the cutting assembly including a rotatable cutting blade having a peripheral cutting edge, a motor for driving the cutting blade, and a linkage for selectively moving the cutting assembly relative to the top surface of the table. The at least one guide rail is desirably coupled with the cutting assembly for guiding sliding movement of the cutting assembly over the top surface of the table between the front and rear ends of the table. The saw also desirably has a fence secured to the base and having a front face that overlies the top surface of the table. The front face of the fence preferably has a lower end that intersects the top surface of the table at a corner, and a locking assembly coupled with at least one of the cutting assembly and the guide rail for locking the cutting assembly in an intermediate position between the front and rear ends of the table. In the intermediate position, the peripheral cutting edge of the cutting blade preferably crosses the corner defined by the intersection of the front face of the fence and the top surface of the table.

In one embodiment, the cutting blade has a diameter of about 10 inches, and in the rear-most position the cutting assembly is adapted to cut a 4×4 work piece and in the intermediate position the cutting assembly is adapted to cut a work piece having a height of at least 3.5 inches.

In one embodiment, a miter saw preferably has a cutting blade having a diameter of about 10" and a 4"×4" nominal size (3.5"×3.5" actual size) work piece (hereinafter referred to as a "4×4 work piece") is positioned on a top surface of a table and against a front face of a fence so that a lower edge of the 4×4 work piece is seated in a corner defined by the intersection of the fence and the table. During a cutting operation, with the cutting assembly in a rear-most position, as the cutting blade moves in a downward direction about a pivot, the peripheral cutting edge of the cutting blade is able to pass through the corner before the blade washer contacts an outer surface of the 4×4 work piece. As a result, the 4×4 work piece, including the portion of the 4×4 work piece seated in the corner, may be completely cut before the blade washer contacts the 4×4 work piece.

In one embodiment, the cutting blade is about 10" in diameter and the miter saw is placed in the optimal position. When the cutting blade is pivoted to a left 45 miter position, the cutting blade is able to cut a TWP that is about 6 inches tall and 0.75 inches wide. When the cutting blade is pivoted to the 0 miter position, the cutting blade is able to cut a TWP that is about 6 inches tall and 0.9 inches wide. When the cutting blade is pivoted to a right 45 miter position, the cutting blade is able to cut a TWP that is about 3.5 inches tall and any thickness wide. In the alternative, for a nipped cut, when in the right 45 miter position, the cutting blade is able to cut a TWP that is about 6 inches tall and about 0.65 inches wide. As is well known to those skilled in the art, a "nipped cut" includes the steps of cutting a work piece to length at a 90 degree angle, and then cutting only the very end of the work piece at a desired angle. Although exact sizes and dimensions have been provided herein, those skilled in the art will readily recognize that the specifications may be modified and still fall within the scope of the present invention.

These and other preferred embodiments of the present invention will be described in more detail below.

BRIEF DESCRIPTION OF THE DRAWINGS

So the manner in which the above recited features of the present invention can be understood in detail, a more particular description of embodiments of the present invention, briefly summarized above, may be had by reference to embodiments, which are illustrated in the appended drawings. It is to be noted, however, the appended drawings illustrate only typical embodiments encompassed within the scope of the present invention, and, therefore, is not to be considered limiting, for the present invention may admit to other equally effective embodiments, wherein:

FIG. 4 shows a side view of the miter saw of FIG. 1 with the cutting assembly in a rear-most position.

FIG. 5 shows a magnified view of a locking assembly of the miter saw of FIG. 1, including a latch and a latch post.

FIG. 6 shows a side view of the miter saw of FIG. 1 with the cutting assembly in a forward-most position.

FIG. 8 shows a side view of the miter saw of FIG. 1 with the latch engaged with the latch post.

FIG. 9 shows a cross-sectional view of the cutting assembly section of the miter saw shown in FIG. 8.

FIG. 10 shows a side view of the cutting assembly in a rear-most position, in accordance with one embodiment of the present invention.

FIG. 11 shows a side view of the cutting assembly in an intermediate position, in accordance with one embodiment of the present invention.

FIG. 12 shows a perspective view of a miter saw including a locking assembly, in accordance with one embodiment of the present invention.

FIG. 13 shows a top plan view of a miter saw having a locking assembly, in accordance with one embodiment of the present invention.

FIGS. 14A and 14B show a cross-sectional view of a miter saw having a locking assembly, in accordance with one embodiment of the invention.

FIG. 15A shows a top plan view of a miter saw having a rotatable locking element, in accordance with one embodiment of the present invention.

FIG. 15B shows a perspective view of the rotatable locking element of FIG. 15A.

DETAILED DESCRIPTION

Figure 1:
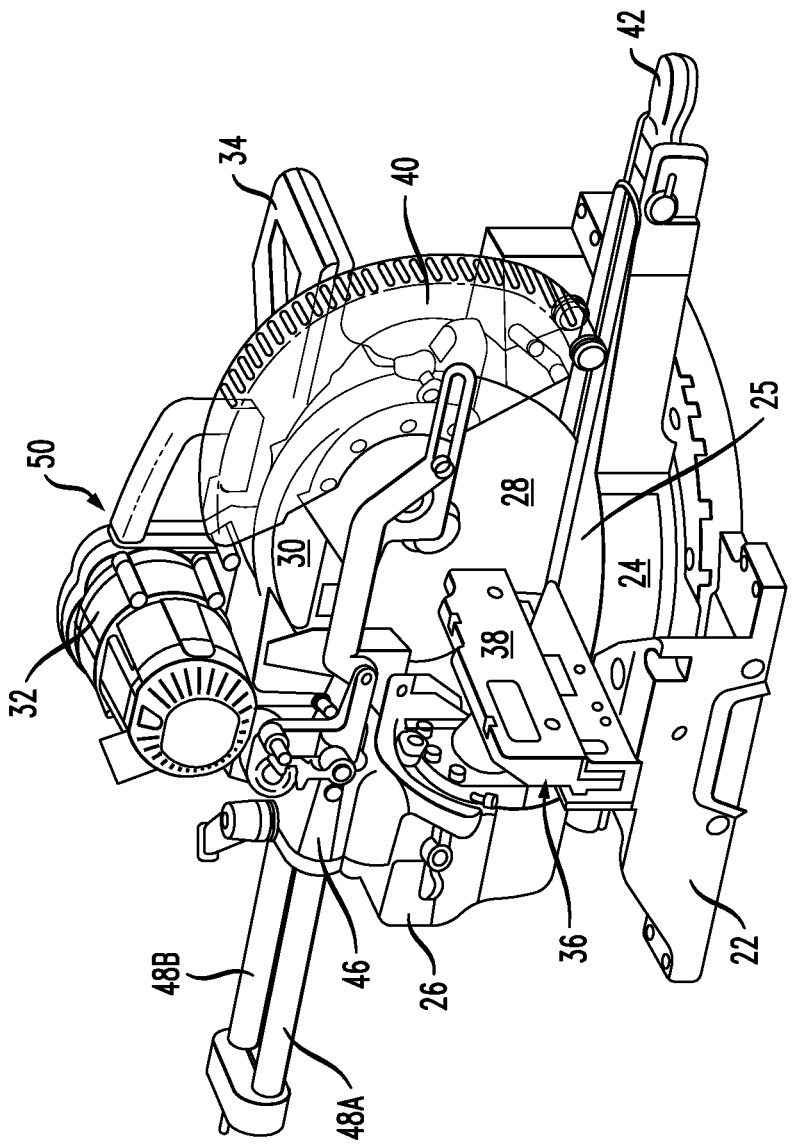
FIG. 1 shows a perspective view of a miter saw including a guide rail that enables a cutting assembly to slide backward and forward over a table, in accordance with one embodiment of the present invention.

The headings used herein are for organizational purposes only and are not meant to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures. For purposes of clarity, and in order to described one or more embodiments of the present invention, terms such as "vertical," "horizontal," "perpendicular," "parallel," "front," "rear," "trailing," "leading," "first end," and "second end" have been used herein. Such terms are merely used to provide a frame of reference for the embodiments shown in the drawings and are not intended to limit the scope of the present invention.

Referring to FIG. 1, in one embodiment, a miter saw 20 includes a base 22, and a table 24 rotatably coupled with the base 22 for being selectively rotated to a plurality of different angles for miter cutting. The table 24 has a top surface 25 that preferably extends in a substantially horizontal direction for supporting a work piece during a cutting, sizing, or shaping operation. The miter saw also desirably includes a compound pivot and slide mounting linkage 26, a cutting blade 28, a fixed blade guard 30 covering an upper part of the cutting blade, a motor 32 drivingly connected to the cutting blade 28, a handle 34, and an adjustable fence assembly 36 including a first fence section 38 and a second fence section (not shown). The miter saw 20 also has a moveable blade guard 40 that covers a front of the cutting blade and that is adapted to slide over the fixed blade guard 30 as the cutting blade is lowered toward the table 24. The rotation of the table 24 changes the angle of the cutting blade 28 relative to the fence assembly 36, but maintains the cutting blade 28 perpendicular to the horizontally-extending top surface of the table 24. A locking mechanism 42 is movable between an unlocked position and a locked position for selectively unlocking and locking the table 24 for rotational movement relative to the base 22.

The compound pivot and slide mounting linkage 26 preferably couples the cutting blade 28 with the table 24, and includes a pivoting structure that enables the cutting blade 28 to be pivoted with respect to the table 24 in order to provide adjustments for bevel cutting. As is well-known by those skilled in the art, the adjustments for mitering and beveling can be separate or they can be adjusted simultaneously in order to provide compound miter and bevel cuts. The pivoting of the compound pivot and slide mounting linkage 26 changes the angle of the cutting blade 28 relative to the table 24, but maintains the perpendicularity of the cutting blade 28 with respect to the adjustable fence assembly 36. One or more locking mechanisms may be engaged in order to lock the compound pivot and slide mounting linkage 26 from further movement relative to the table 24. Thus, the cutting blade 28 may be locked at a plurality of different bevel angles, and the angle will not change so long as the one or more locking mechanisms remain locked.

The compound pivot and slide mounting linkage 26 includes a support housing 46 provided at an upper end thereof that is adapted to receive a pair of guide rails 48A, 48B for enabling forward and rearward sliding movement of a cutting assembly 50 that includes the cutting blade 28, the fixed blade guard 30, the motor 32 and the handle 34. The cutting assembly 50 may be pivoted downwardly toward the horizontally-extending top surface 25 of the table 24. This downward pivoting action opens the movable blade guard 40 to expose the cutting blade 28. After the cutting blade has been exposed, it may be used to cut work pieces supported by the top surface 25 of the table 24 and the fence 36. The sliding movement of the guide rails 48 relative to the support housing 46 enables the cutting assembly 50 and thus the cutting blade 28 to be pulled through the work pieces, including those instances where the size of the work piece exceeds the cutting width of the cutting blade.

In one embodiment of the present invention, the adjustable fence 36 is interconnected with the base 22 and extends laterally across the horizontally-extending top surface of the rotatable table 24. The adjustable fence 36 is adapted to support and properly align a work piece during a cutting operation. The adjustable fence 36 may include a first fence part having a fixed fence and a movable fence that is slideable over the fixed fence, and a second fence part having a fixed fence and a moveable fence section that is slideable over the fixed fence. The lateral spacing between the two movable fences provides clearance for the cutting blade 28 to perform a cutting operation completely through the work piece, regardless of the mode or type of cutting operation being performed. The movable fences are each movable toward and away from the cutting blade 28 in order to allow the operator to selectively adjust the clearance gap therebetween and thus accommodate the particular cutting operation being performed. The present invention may incorporate one or more of the fence embodiments disclosed in commonly assigned U.S. patent application Ser. No. 11/872,674, filed Oct. 15, 2007, the disclosure of which is hereby incorporated by reference herein.

Figure 2:
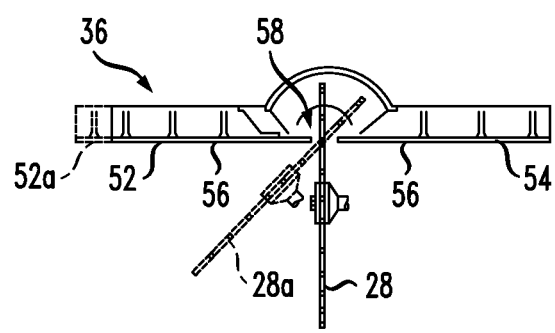
FIG. 2 is a top plan view of the miter saw of FIG. 1, showing the position of a cutting blade relative to a fence in a straight cross-cutting position and a miter cutting position.
Figure 3:
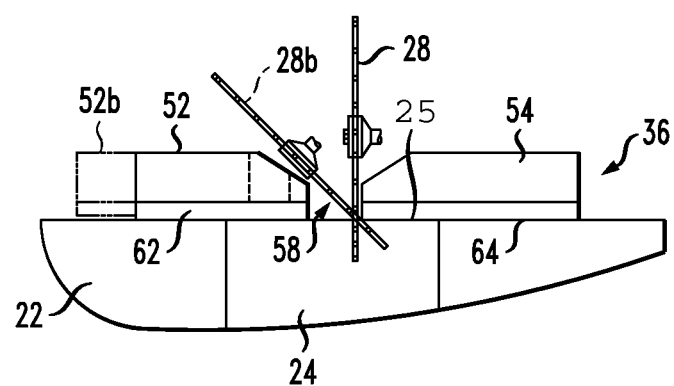
FIG. 3 is a front elevation view of the fence of FIG. 2, showing the position of the cutting blade relative to the fence in a straight cutting position and a bevel cutting position.

Referring to FIGS. 2 and 3, in certain preferred embodiments of the present invention, the miter saw disclosed herein is capable of a number of different cutting modes or positions. Referring to FIG. 2, the cutting blade 28 (shown in solid lines) may be positioned at an angle that is perpendicular to the support face of the adjustable fence 36 for performing a straight sliding or straight miter-cutting operation. The adjustable fence includes movable fences 52, 54 that are selectively adjusted to provide an optimum clearance gap between the cutting blade 28 and the two movable fences 52, 54, to permit the cutting blade 28 to be moved into the cutting position along a single, vertical plane, substantially perpendicular to both the front work piece-supporting face 56 of the adjustable fence 36 and the top surface 25 of the table 24 (FIG. 1). To permit miter cutting, as schematically illustrated in phantom lines in FIG. 2, the first movable fence 52 is selectively adjusted, as indicated in phantom by reference numeral 52a, to increase the clearance gap 58 between the cutting blade 28a and the first movable fence 52. The wider gap 58 preferably provides sufficient clearance for the cutting blade 28a and any components associated therewith.

FIG. 3 shows a front elevational view of FIG. 2, depicting the position of the cutting blade 28 and the movable fences 52, 54 as solid lines for performing the above-described straight, square, and sliding cutting operation. The relative positions of the cutting blade 28 and the movable fence 52 are shown in phantom lines, as indicated by reference numerals 28b and 52b, respectively, for performing bevel cuts on a work piece (not shown). The plane of movement of the cutting blade 28b is generally perpendicular to the face of the fence assembly 36, but can be selectively oriented at a bevel angle with respect to a top surface 60 of the table assembly 24. As described above, the first movable fence 52 can be adjusted to a predetermined position, as shown in phantom at 52b, to accommodate the bevel angle selected for the cutting blade 28b. In one embodiment of the present invention, fence section 52 is slideable laterally over a first fixed fence 62, and fence section 54 is slideable laterally over second fixed fence 64. The two movable fences 52, 54 are capable of moving independently of one another for adjusting the size of the gap 58 therebetween.

Although not specifically illustrated in the drawings, one skilled in the art will readily recognize, from the exemplary positions shown in FIGS. 2 and 3, that a miter-cutting operation can be combined with a bevel-cutting operation in order to perform compound mitering. In a compound miter cut, the cutting blade 28 moves in a plane that is not perpendicular to either the front, vertically-extending face 56 of the adjustable fence 36 or to the top, horizontally-extending face 60 of the table 24. In addition, although not specifically illustrated in the drawings, one skilled in the art will readily recognize, from the exemplary positions shown in FIGS. 2 and 3, that the miter-cutting operation and the bevel-cutting operation can be performed by angling the cutting blade 28 in the opposite direction from what is illustrated and then selectively adjusting movable fence 54 (to the right in FIGS. 2 and 3) in a manner similar to that shown and described for movable fence 52.

Thus, the sliding compound miter saw 20 shown and described herein is capable of making at least four general types of cutting operations, namely sliding, miter-cutting, bevel-cutting and compound miter-cutting operations. The miter-cutting, bevel-cutting and compound miter-cutting operations can be performed by angling the cutting blade 28 in either direction from the sliding operation due to the incorporation of movable fences 52, 54 on opposite sides of the cutting blade 28. The miter saw preferably has infinite compound adjustability of the relative position and orientation of the cutting blade 28 relative to both the table 24 and the adjustable fence 36. The infinite adjustability can be accomplished in the present invention by way of the compound pivot and slide mounting linkage 26 shown and described above in FIG. 1. The compound pivot and slide mounting mechanism 26 can be any of a number of well-known pivot and bevel mounting and support mechanisms which allow the cutting blade 28 and the fixed cutting blade guard 30 to be pivotally and slideably moved from a rear, raised, clear position to a lowered or cutting position. Once the miter saw 20 is adjusted to the desired operating mode, a cutting operation may be performed on a work piece by lowering the cutting blade 28 into the work piece and then moving the cutting blade 28 through the work piece. In order to allow a complete cut-through operation to be performed on the work piece by the cutting blade 28, the fence assembly 36 must be capable of selective adjustment in order to adjust the lateral clearance gap or spacing between the cutting blade 28 and the two movable fences 52, 54, while still providing adequate vertical support for the work piece.

Referring to FIG. 4, in one embodiment, the cutting blade 28 is secured to the cutting assembly 50 using a blade washer 70 and a locking screw 72. In one embodiment, the cutting blade 28 has a diameter of about 10 inches and the blade washer 70 has a diameter of 2 inches. In other embodiments, the cutting blade and the blade washer may have smaller or larger diameters than set forth above. The blade washer 70 is tightened onto a major face of the cutting blade 28 using the locking screw 72. After the blade washer 70 has been secured over the cutting blade using the locking screw, the cutting blade may not be removed. When it is desirable to replace the cutting blade, the locking screw 72 may be loosened for removing the blade washer 70 and then removing the cutting blade from the cutting assembly 50.

The miter saw 20 has a front end designated F, which is on the right side of FIG. 4, and a rear end designated R, which is on the left side of FIG. 4. The guide rails 48A, 48B guide sliding movement of the cutting assembly 50 between the front end F and the rear end R of the table 24. In FIG. 4, the cutting assembly 50 has been advanced to its rear-most position, with the guide rails 48A, 48B fully extended from the distal end of the guide rail support housing 46. A guide rail stop 74 is secured to the distal ends of the guide rails 48A, 48B. Sliding movement of the cutting assembly 50 toward the forward end F is halted when a proximal end of the guide rail stop 74 abuts against the distal end of the guide rail support housing 46.

The fence 36 has a front face 56 that is adapted to support a work piece. The front face 56 of the fence 36 has an upper end 76 and a lower end 78 that intersects with the top surface 25 of the table 24. The intersection of the front face 56 of the fence 36 and the top surface 25 of the table defines a corner 80 that is adapted to support an edge of a work piece. As the cutting assembly 50 slides between the forward end F and the rear end R, the cutting blade 28 may pass through a gap in the fence 36.

The miter saw 20 also preferably includes a locking assembly 82 that is adapted to secure the cutting assembly 50 at an intermediate, optimal cutting position that is located between the rear-most sliding position of the cutting assembly and the forward-most sliding position of the cutting assembly. In one embodiment, the intermediate position is located slightly forward of the rear-most position, and is a highly preferred position for cutting certain types of work pieces such as tall molding pieces (e.g. crown molding, tall base board moldings). The intermediate position may also be selected for maximizing the working area or working length of a cutting blade.

Referring to FIG. 5, in one embodiment, the locking assembly 82 includes a latch 84 having a proximal end 86 pivotally secured to the cutting assembly 50 via a locking screw 88 and a distal end 90 having a slide ramp 92. The locking assembly 82 desirably includes a latch post 94 that extends from the guide rail support housing 46. The latch 84 preferably includes a locking slot 96 located between a proximal end of the slide ramp 92 and the proximal end 86 of the latch. The latch 84 also has a stop flange 98 extending from a distal end of the locking slot 96. The stop flange 98 preferably defines the widest section of the latch 84.

As will be described in more detail below, in order to position the cutting assembly 50 at the intermediate, optimal cutting position, the slot 96 of the latch 84 first engages the latch post 94. In a preferred embodiment, the latch post 94 is captured within the locking slot 96 of the latch 84 so that the cutting assembly 50 is arrested from further sliding movement between the rear and front ends of the miter saw. In one highly preferred embodiment, when the latch engages the latch post, the cutting assembly is locked from sliding movement and is incapable of sliding toward either the front end or the rear end of the miter saw. In order to once again slide the cutting assembly, the slot 96 of the latch 84 must be decoupled from the latch post. Persons skilled in the art will recognize that the latch 84 and the latch post 94 may be disposed on the support housing 46 and the cutting assembly 50, respectively.

FIG. 6 shows the cutting assembly 50 of the miter saw 20 after it has been moved to its forward-most position. In the forward-most position, a gap exists between the peripheral edge 100 of the cutting blade 28 and the corner 80 between the front face 56 of the fence 36 and the top surface 25 of the table 24. The forward sliding movement of the cutting assembly 50 is arrested by the guide rail stop 74 abutting against the distal end of the guide rail support housing 46. In FIG. 6, the latch of the locking assembly 82 is in an upright, unlocked position, so that it does not contact the latch post 94. As a result, the cutting assembly 50 is free to slide between the rear end R and the forward end F of the miter saw 20.

The miter saw 20 shown in FIGS. 4-6 is adapted to cut work pieces having different sizes. In order to perform a cutting operation, the work piece is preferably supported by the top surface 25 of table 24 and pushed against the front face 56 of the fence 36 so that an edge of the work piece is disposed within the corner 80 defined by the intersection of the front face 56 of the fence 36 and the top surface 25 of the table 24. During a cutting operation, as the cutting blade 28 passes through the work piece, the outer peripheral edge 100 of the cutting blade 28 preferably passes through the corner 80 so that the section of the work piece located at the edge 80 is cut. If the peripheral edge 100 of the cutting blade 28 is unable to reach the corner 80, then the portion of the work piece disposed in the corner will not be cut. This may occur, for example, if the blade washer 70 contacts the work piece so as to prevent the peripheral edge 100 from reaching the corner 80.

Figure 7A:
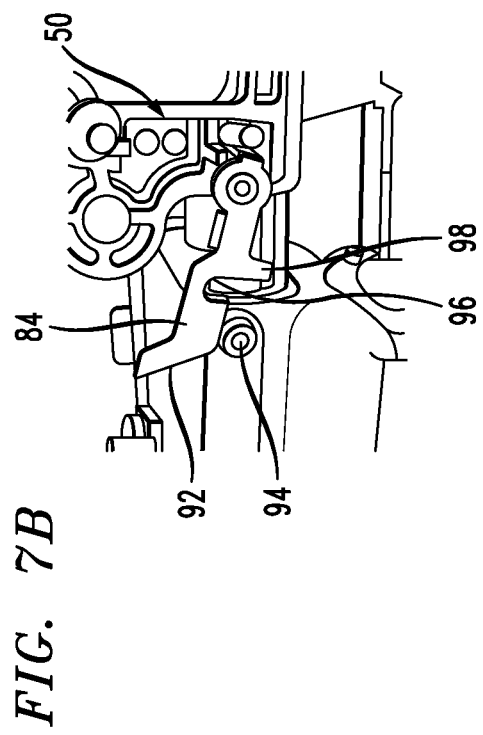
FIGS. 7A-7C show the engagement of the latch and the latch post of FIG. 5 as the cutting assembly slides rearwardly over the guide rail.
Figure 7B:
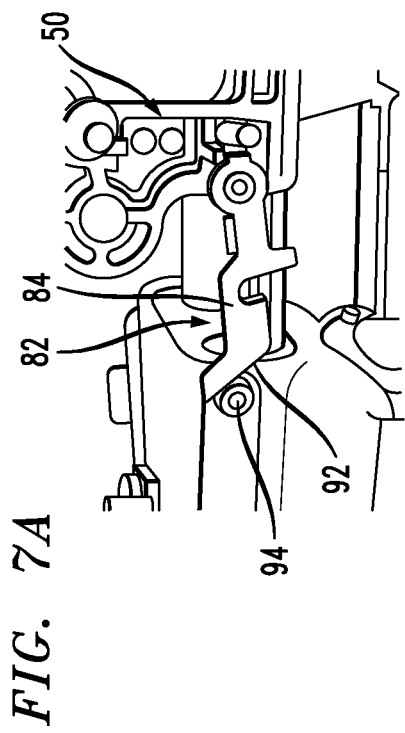
Figure 7C:
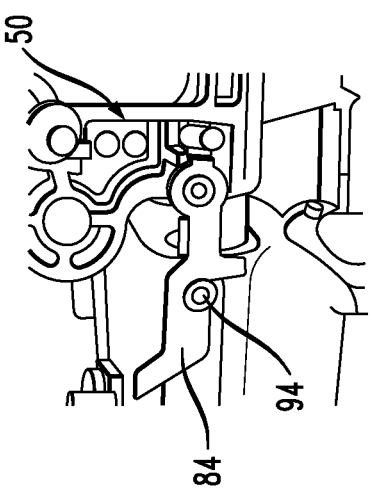

FIGS. 7A-7C show how a locking assembly 82 locks a cutting assembly 50 in the intermediate, optimal cutting position, in one embodiment of the present invention. In FIG. 7A, the latch 84 is pivoted into a generally horizontal orientation so that the slide ramp 92 is in substantial alignment with the latch post 94. As the cutting assembly 50 is slid toward the rear end of the miter saw, the slide ramp 92 abuts against the shaft of the latch post 94. Referring FIG. 7B, further rearward sliding movement of the cutting assembly 50 causes the latch 84 to pivot in a clockwise direction as the slide ramp 92 slides over the latch post 94. The cutting assembly may be slid further toward the rear end of the miter saw until the stop flange 98 of the latch 84 abuts against the latch post 94. Once the stop flange 98 contacts the latch post 94, further rearward sliding movement of the cutting assembly is halted. At that point, the latch 84 may be pivoted slightly in a counter-clockwise direction so that the latch post 94 is fully seated in the locking slot 96 of latch 84. FIG. 7C shows the latch post 94 seated within the locking pocket of the latch 94. With the latch 84 in this position, the cutting assembly 50 is stopped from further sliding movement toward either the front end or the rear end of the miter saw. Moreover, the cutting assembly 50 is positioned at the intermediate, optimal cutting position disclosed herein for maximizing the cutting capability of the miter saw for certain types of work pieces (e.g. tall molding pieces).

FIG. 8 shows the locking assembly 82 in the locked position for holding the cutting assembly 50 and the cutting blade 28 at the intermediate, optimal cutting position, which is located between the front end F and the rear end R of the miter saw 20. As shown in FIG. 8, the latch 84 is engaged with the latch post 94 for preventing sliding movement of the cutting assembly 50. As a result, the cutting assembly 50 is arrested from any sliding movement toward either the rear end R or the front end F of the miter saw. In the intermediate position of FIG. 8, a proximal section of the guide rail 48 projects slightly from a proximal end of the guide rail support housing 46, and the cutting blade 28 is positioned for maximizing cutting efficiency. In one embodiment, in the intermediate position, the peripheral cutting edge of the cutting blade 28 is preferably intersects the corner 80 so that the cutting blade 28 just cuts through the edge of the work piece located at the corner 80 between the fence 36 and the table 24.

FIG. 9 shows a cross-sectional view of the cutting assembly 50 and the cutting blade 28 locked in the intermediate, optimal position. In the intermediate position, the pivot 115 of the cutting assembly is slid forward of the rear-most position (FIG. 4) so that the peripheral cutting edge 100 of the cutting blade 28 just passes through the corner 80 defined by the intersection of the front face 56 of the fence 36 and the top surface 25 of the table 24. As the cutting assembly is moved from the rear-most position shown in FIG. 4 to the intermediate position shown in FIG. 9, the blade washer 70 is preferably rotated away from the fence 36 to maximize the space between the blade washer 70 and the front face 56 of the fence 36, which increases the size of a work piece that may be cut when using the miter saw. The intermediate position also maximizes the cutting ability of the cutting blade 28 in that the leading peripheral edge 100 of the cutting blade passes through a forward-most point 104 of the top surface 25 of the table 24. The chord 106 of the cutting blade extending between the corner 80 and the forward point 104 is the working length L of the cutting blade. In one embodiment, this length L is at its maximum when the miter saw is placed in the intermediate, optimal position using the locking assembly shown and described herein.

FIG. 10 shows a miter saw 20 in accordance with one embodiment of the present invention after the pivot 115 and the cutting assembly 50 are slid to the rear-most position (see FIG. 4). In one embodiment, the miter saw 20 has a cutting blade 28 having a diameter of 10" and a 4"×4" nominal size (3.5"×3.5" actual size) work piece (hereinafter referred to as a "4×4 work piece") is positioned on the top surface 25 of the table and against the front face 56 of the fence so that a lower edge of the 4×4 work piece is seated in the corner 80. During a cutting operation, as the cutting blade 28 moves in a downward direction about pivot 115, the peripheral cutting edge 100 of the cutting blade 28 is able to pass through the corner 80 before the blade washer 70 contacts an outer surface of the 4×4 work piece. As a result, the 4×4 work piece, including the portion of the 4×4 work piece seated in the corner 80, may be completely cut before the blade washer 70 contacts the 4×4 work piece. Stated another way, the peripheral cutting edge 100 of the cutting blade 28 is able to pass through the corner 80 before the blade washer 70 contacts the outer surface of the 4×4 work piece. In contrast, as represented by the dashed lines in FIG. 10, the cutting blade in the rear-most position will be unable to cut a taller work piece (hereinafter referred to a "TWP"), such as a crown molding piece or a tall base board piece. This is because the blade washer 70 will contact a surface of the TWP before the peripheral cutting edge 100 of the cutting blade 28 passes through the lower edge portion of the TWP seated in the corner 80. Thus, although the cutting assembly in the rear-most position of FIG. 10 can cut the 4×4 work piece, it cannot cut completely through the TWP.

FIG. 11 shows the miter saw 20 after the cutting assembly 50 and the pivot 115 have been moved to the intermediate, optimal cutting position, which is preferably located forward of the rear-most position shown in FIG. 10. In FIG. 11, the cutting assembly is preferably secured in the intermediate position using one or more embodiments of the locking assembly described herein. In one embodiment, the pivot 115 is moved forward about 20-25 mm and more preferably about 22 mm from the rear-most position (FIG. 4) so as to place the cutting assembly 50 in the intermediate, optimal cutting position. As the pivot 115 is moved toward the forward end of the miter saw, the blade washer 70 also shifts toward the forward end of the miter saw so as to provide more space between the blade washer 70 and the front face 56 of the fence. In the optimal position of FIG. 11, as the cutting blade 28 moves downwardly to cut a work piece, the peripheral cutting edge 100 of the cutting blade 28 is able to pass completely through the corner 80 before the blade washer 70 engages a surface of the taller work piece TWP. However, as shown by dashed lines, the blade washer 70 will contact a 4×4 work piece before the peripheral cutting edge 100 is able to pass through the corner 80 and completely cut the 4×4 work piece. In other words, when the cutting assembly has been moved forward to the intermediate, optimal cutting position of FIG. 11, the cutting assembly 50 can cut through a taller work piece TWP, but cannot cut through a 4×4 work piece.

In one embodiment, when the miter saw is in the intermediate, optimal cutting position shown in FIG. 11, the cutting blade 28 has a diameter of about 10". When the cutting blade 28 is pivoted to a left 45 miter position, the cutting blade is able to cut a TWP that is about 6 inches tall and 0.75 inches wide. When the cutting blade 28 is pivoted to the 0 miter position, the cutting blade is able to cut a TWP that is about 6 inches tall and 0.9 inches wide. When the cutting blade 28 is pivoted to a right 45 miter position, the cutting blade is able to cut a TWP that is about 3.5 inches tall and any thickness wide. In the alternative, for a nipped cut, when in the right 45 miter position, the cutting blade is able to cut a TWP that is about 6 inches tall and about 0.65 inches wide. As is well known to those skilled in the art, a "nipped cut" includes the steps of cutting a work piece to length at a 90 degree angle, and then cutting only the very end of the work piece at a desired angle. In one embodiment, when the miter saw is in the intermediate, optimal position of FIG. 11, when using a cutting blade having a 10" diameter, at a left 45 miter the cutting assembly will cut at least about a 6" tall TWP and in one embodiment preferably about 7", and at a right 45 miter the cutting assembly will cut at least about 3.5" tall TWP. In one embodiment, the cutting assembly disclosed herein is capable of cutting a crown molding (positioned against the fence) having a height of at least 6.25 inches and a base board (positioned against the fence) having a height of at least 6 inches. Although exact specifications have been provided above, those skilled in the art will readily recognize that the specifications may be modified and still fall within the scope of the present invention.

As shown in FIG. 11, a tall work piece TWP may be positioned at the corner 80 defined as the intersection of the front face 56 of the fence 36 with the top surface 25 of the table 24. The TWP must fit between the blade washer 70, the underside of the fixed blade guard 30, and the front face 56 of the fence 36. As is evident in FIGS. 10 and 11, when the cutting assembly is positioned more toward the rear end R of the miter saw 20, the blade washer 70 contacts the TWP before the peripheral cutting edge of the cutting blade can cut completely through the TWP positioned against the fence 36. Moreover, if the cutting blade 28 were positioned more toward the front end F of the miter saw 20 than in the position shown in FIG. 11 (e.g. the FIG. 6 position), the peripheral edge 100 of the cutting blade 28 would not reach the corner 80 defined by the intersection of the fence 36 and the table top 24.

Although a locking assembly including a latch and a latch post is shown and described above, it is contemplated that many different types of locking assemblies may be used for locating cutting assemblies at the intermediate, optimal cutting position. FIG. 12 shows a preferred location for positioning the locking assemblies. In FIG. 12, a miter saw includes a guide rail support housing 146 having openings for receiving guide rails 148A, 148B. A preferred location for one or more locking assemblies is circled in FIG. 12.

Referring to FIG. 13, in one embodiment, a locking assembly may include a projection 251 provided at the distal end of a guide rail support housing 246 that is adapted to engage one or more of the guide rails 248A, 248B. The projection 251 preferably engages a groove 253 formed in at least one of the guide rails 248A, 248B. The groove 253 is positioned so that the engagement of the projection 251 with the groove 253 positions the cutting assembly 250 at the intermediate, optimal cutting location described herein. When the projection 251 is not seated in the groove 253, the guide rails 248A, 248B are adapted to slide freely between the rear-most position and the forward-most position.

Referring to FIGS. 14A-14B, in one embodiment, a pivoting latch 355 may be provided between the guide rails 348A, 348B. The pivoting latch 355 preferably engages at least one of the guide rails when in a locked position for preventing any sliding movement of the cutting assembly. In the locked position of FIG. 14A, the latch 355 preferably engages a notch 357 formed in the periphery of the guide rail 348B, for preventing the guide rails from sliding. The notch 357 is preferably positioned at a predetermined location along the length of the second guide rail 348B for positioning the cutting assembly at the intermediate, optimal cutting position when the latch 355 engages the notch 357. When it is desirable to slide the cutting assembly, the latch 355 is moved into the unlocked position shown in FIG. 14B.

Referring to FIGS. 15A and 15B, in one embodiment, the locking assembly includes a rotatable locking element 475 is provided on the guide rail support housing 446. The rotatable locking element 475 has a short post 477 and a longer post 479. In a first position, the locking element 475 is rotated so that the short post 477 is aligned with the guide rail stop 474. In the first position, the cutting assembly may be slid all the way to the rear-most position. In a second position, the locking element 475 is rotated so that the long post 479 is aligned with the guide rail stop 474. In the second position, the cutting assembly 450 may only be slid to the intermediate, optimal cutting position described herein. In one embodiment, the rotatable locking element 475 preferably engages at least one of the guide rails 448A, 448B when the cutting assembly is positioned at the intermediate, optimal cutting location.

One or more embodiments of the present invention may incorporate one or more features disclosed or suggested in commonly assigned U.S. Pat. Nos. 5,297,463; 6,426,309; 6,899,005; and 7,210,385; and U.S. Patent Application Publication Nos. 2002/0152867; 2004/0079214; 2004/0103768; and 2007/0214928, the disclosures of which are hereby incorporated by reference herein.

One skilled in the art will readily recognize from the following description, taken in conjunction with the accompanying drawings and claims, that the principles of the present invention are equally applicable to sliding compound miter saws, compound miter saws, chop saws, radial arm saws, table saws, jigsaws, scroll saws, or other types of saws than those shown and described herein. The present invention is also applicable to other types of powered or unpowered equipment for performing an operation on a work piece including, but is not limited to, dado saws, spindle shapers or sanders, or other types of powered or unpowered devices that would benefit from using one or more features of the present invention.

While the foregoing is directed to embodiments of the present invention, other and further embodiments of the invention may be devised without departing from the basic scope thereof.

What is claimed is:

1. A miter saw comprising:
   a base;
   a table disposed on said base, said table having a top surface extending between a front end and a rear end of said table;
   a cutting assembly overlying said table, said cutting assembly including a rotatable cutting blade having a peripheral cutting edge, and a motor for driving said cutting blade;
   at least one guide rail interconnecting said table and said cutting assembly for guiding sliding movement of said cutting assembly over said table between a rear-most position and a forward-most position; and
   a locking assembly coupled with said cutting assembly for locking said cutting assembly in only one position, an intermediate position, located between the rear-most position and the forward-most position, wherein during a cutting operation said locking assembly remains coupled with said cutting assembly while said cutting blade moves downwardly for preventing sliding movement of said cutting assembly.

2. The miter saw as claimed in claim 1, further comprising a fence secured to said base, said fence having a front face overlying the top surface of said table, wherein said fence and the top surface of said table define a corner, and wherein the peripheral cutting edge of said cutting blade intersects the corner when said cutting assembly is in the intermediate position.

3. The miter saw as claimed in claim 1, further comprising a support housing connected with said table, said support housing being adapted to guide sliding motion of said at least one guide rail.

4. The miter saw as claimed in claim 3, wherein said at least one guide rail has a longitudinal axis that extends in a first plane that is substantially parallel with the top surface of said table.

5. The miter saw as claimed in claim 3, wherein a distal end of said cutting assembly is coupled with a proximal end of said at least one guide rail, and wherein said cutting assembly is adapted to slide simultaneously with said at least one guide rail.

6. The miter saw as claimed in claim 3, wherein said locking assembly comprises:
   a latch coupled with said cutting assembly; and
   a latch post coupled with said support housing, wherein said latch is movable for engaging said latch post for locking said cutting assembly in the intermediate position.

7. The miter saw as claimed in claim 6, wherein said latch comprises:
   a proximal end pivotally connected with said cutting assembly;
   a distal end;

a sloping surface extending from the distal end toward the proximal end of said latch;

a slot formed in a lower edge of said latch being located between the sloping surface and the proximal end of said latch; and a stop flange disposed between said slot and the proximal end of said latch, wherein said sloping surface extends laterally above an upper edge of said latch for defining a distal-most end of said latch.

8. The miter saw as claimed in claim 7, further comprising:

a latch pivot axis; and a latch post, wherein said latch rotates about said latch pivot axis for capturing said latch post within said slot of said latch for locking said cutting assembly in the only one position, wherein said latch pivot axis and said latch post are arranged on a plane substantially parallel to said guide rail.

9. The miter saw as claimed in claim 8, wherein the engagement of said slot with said latch post prevents sliding movement of said cutting assembly.

10. The miter saw as claimed in claim 1, wherein said cutting blade has a diameter of about 10 inches, and wherein when said cutting assembly is in the rear-most position said cutting assembly is adapted to cut a 4×4 work piece.

11. A miter saw comprising:

a base;

a table rotatably disposed on said base, said table having a top surface extending between a front end and a rear end thereof;

a cutting assembly overlying said table, said cutting assembly including a rotatable cutting blade having a peripheral cutting edge, and a motor for driving said cutting blade;

at least one guide rail coupled with said table and said cutting assembly for guiding sliding movement of said cutting assembly over the top surface of said table between the front and rear ends of said table;

a fence secured to said base and having a front face that overlies the top surface of said table, said front face and the top surface of said table defining a corner; and a locking assembly coupled with said cutting assembly for locking said cutting assembly in only one position, an intermediate position, between the front and rear ends of said table, wherein in the intermediate position the peripheral cutting edge of said cutting blade intersects the corner defined by the front face of said fence and the top surface of said table, and said locking assembly remains coupled with said cutting assembly while said cutting blade moves downwardly during a cutting operation for preventing sliding movement of said cutting assembly.

12. The miter saw as claimed in claim 11, further comprising a support housing connected with said table, said support housing being adapted to guide sliding movement of said at least one guide rail.

13. The miter saw as claimed in claim 12, wherein said locking assembly comprises:

a latch coupled with said cutting assembly; and a latch post coupled with said support housing, wherein said latch is movable for engaging said latch post for locking said cutting assembly in the intermediate position.

14. The miter saw as claimed in claim 13, wherein said latch comprises:

a proximal end pivotally connected with said cutting assembly;

a distal end remote from the proximal end;

a sloping surface extending from the distal end toward the proximal end of said latch;

a slot formed in a lower edge of said slot being located between the sloping surface and the proximal end of said latch; and a stop flange disposed between said slot and the proximal end of said latch, wherein said sloping surface extends laterally above an upper edge of said latch for defining a distal-most end of said latch.

15. The miter saw as claimed in claim 14, further comprising:

a latch post axis; and a latch post, wherein said latch rotates about said latch post axis such that said latch post is captured within said slot of said latch for locking said cutting assembly in the only one position, and wherein said latch post axis and said latch post are arranged on a plane substantially parallel to said guide rail.

16. The miter saw as claimed in claim 15, wherein the engagement of said slot with said post prevents sliding movement of said cutting assembly.

17. A miter saw comprising:

a base;

a table rotatably disposed on said base, said table having a top surface extending between a front end and a rear end of said table;

a guide rail support housing connected with said table;

a guide rail extending through said guide rail support housing, wherein said guide rail support housing is adapted to guide sliding movement of said guide rail within a plane that is substantially parallel with the top surface of said table;

a cutting assembly overlying said table, said cutting assembly including a rotatable cutting blade having a peripheral cutting edge, and a motor for driving said cutting blade, said guide rail being coupled with said cutting assembly for guiding sliding movement of said cutting assembly over the top surface of said table between the front and rear ends of said table;

a fence secured to said base and having a front face that overlies the top surface of said table, said front face of said fence and the top surface of said table defining a corner; and a locking assembly coupled with said cutting assembly for locking said cutting assembly in only one position, an intermediate position, between the front and rear ends of said table, wherein in the intermediate position the peripheral cutting edge of said cutting blade crosses the corner defined by the front face of said fence and the top surface of said table, wherein said locking assembly remains coupled with said cutting assembly while said cutting blade moves downwardly during a cutting operation for preventing sliding movement of said cutting assembly.

18. The miter saw as claimed in claim 17, wherein said locking assembly comprises:

a latch coupled with said cutting assembly; and a latch post coupled with said guide rail support housing, wherein said latch is movable for engaging said latch post for locking said cutting assembly in the intermediate position.

19. The miter saw as claimed in claim 18, wherein said latch comprises:

a proximal end pivotally connected with said cutting assembly;

a distal end remote from the proximal end;

a sloping surface extending from the distal end toward the proximal end of said latch;

a locking slot located between the sloping surface and the proximal end of said latch; and a stop flange disposed between said locking slot and the proximal end of said latch, wherein said sloping surface extends laterally above an upper edge of said latch for defining a distal-most end of said latch.

20. The miter saw as claimed in claim 19, further comprising:

a latch post axis; and a latch post, wherein said latch rotates about said latch post axis such that said latch post is captured within said locking slot of said latch for locking said cutting assembly in the only one position, and wherein said latch post axis and said latch post are arranged on a plane substantially parallel to said guide rail.

* * * * *